US010114838B2

(12) United States Patent
Ali et al.

(10) Patent No.: US 10,114,838 B2
(45) Date of Patent: Oct. 30, 2018

(54) REFERENCE CARD FOR SCENE REFERRED METADATA CAPTURE

(71) Applicant: DOLBY LABORATORIES LICENSING CORPORATION, San Francisco, CA (US)

(72) Inventors: Arshad Ali, Union City, CA (US); Peter Longhurst, Vancouver (CA); Eric Kozak, Burnaby (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 470 days.

(21) Appl. No.: 14/389,997

(22) PCT Filed: Apr. 16, 2013

(86) PCT No.: PCT/US2013/036814
§ 371 (c)(1),
(2) Date: Oct. 1, 2014

(87) PCT Pub. No.: WO2013/165687
PCT Pub. Date: Nov. 7, 2013

(65) Prior Publication Data
US 2015/0066923 A1    Mar. 5, 2015

Related U.S. Application Data

(60) Provisional application No. 61/640,166, filed on Apr. 30, 2012.

(51) Int. Cl.
*G06K 9/00* (2006.01)
*G06F 17/30* (2006.01)
(Continued)

(52) U.S. Cl.
CPC ...... *G06F 17/30256* (2013.01); *G11B 27/031* (2013.01); *G11B 27/322* (2013.01);
(Continued)

(58) Field of Classification Search
None
See application file for complete search history.

(56) References Cited

U.S. PATENT DOCUMENTS 6,034,721 A    3/2000  Mangeat
7,136,187 B1 * 11/2006  Ohkubo ............... H04N 1/6033
                                              348/E9.047
(Continued)

FOREIGN PATENT DOCUMENTS

JP    2007-503030    2/2007
JP    2008-005540    1/2008
(Continued)

OTHER PUBLICATIONS

Laganiere et al., "Video Summarization from Spatio-Temporal Features", TVS '08 Proceedings of the 2nd ACM TRECVid Video Summarization Workshop, Oct. 2008, pp. 144-148.*
(Continued)

*Primary Examiner* — Matthew Bella
*Assistant Examiner* — Jose M Torres

(57) ABSTRACT

Scene-referred metadata comprising correspondence relationships between coded values used in generated images and reference values defined independent of any specific image may be provided as a part of image metadata for the generated images. Downstream image processing devices or image rendering devices may use the scene-referred metadata to perform image processing or rendering operations. When coded values of input images are altered in corresponding output images, the scene-referred metadata may be updated with new coded values used in the output images. Reference values refer to reference color values or reference gray levels. Coded values refer to color values or gray levels coded in pixels or sub-pixels of one or more images.

20 Claims, 6 Drawing Sheets

(51) Int. Cl.
*H04N 1/60* (2006.01)
*H04N 5/262* (2006.01)
*H04N 5/77* (2006.01)
*H04N 9/82* (2006.01)
*G11B 27/031* (2006.01)
*G11B 27/32* (2006.01)
*H04N 9/64* (2006.01)

(52) U.S. Cl.
CPC ......... *H04N 1/6027* (2013.01); *H04N 1/6033* (2013.01); *H04N 5/262* (2013.01); *H04N 5/77* (2013.01); *H04N 9/64* (2013.01); *H04N 9/8205* (2013.01)

(56) References Cited

U.S. PATENT DOCUMENTS

| | | |
|---|---|---|
| 2003/0146982 A1 | 8/2003 | Tindall |
| 2004/0179101 A1 | 9/2004 | Bodnar |
| 2004/0257599 A1 | 12/2004 | Chi |
| 2005/0174473 A1 | 8/2005 | Morgan |
| 2007/0071314 A1 | 3/2007 | Bhatti |
| 2008/0088858 A1 | 4/2008 | Marcu |
| 2008/0317357 A1 | 12/2008 | Steinberg |
| 2009/0074244 A1 | 3/2009 | Sloan |
| 2010/0042650 A1* | 2/2010 | Roenning ............ G11B 27/105 386/282 |
| 2010/0225769 A1* | 9/2010 | Cho .................... H04N 17/002 348/188 |
| 2011/0085025 A1* | 4/2011 | Pace .................... H04N 9/8205 348/49 |
| 2011/0102643 A1 | 5/2011 | Nanu |
| 2011/0149109 A1 | 6/2011 | Cho |
| 2012/0301127 A1* | 11/2012 | Elliott .................... G03B 15/00 396/310 |

FOREIGN PATENT DOCUMENTS

| | | |
|---|---|---|
| JP | 2010-537672 | 12/2010 |
| KR | 10-2000-0051129 | 8/2000 |
| WO | 01/80183 | 10/2001 |
| WO | 2002/013136 | 2/2002 |
| WO | 2004/028144 | 4/2004 |
| WO | 2007/078563 | 7/2007 |
| WO | 2009/095733 | 8/2009 |
| WO | WO 2010083493 A1 * | 7/2010 ........... H04N 1/6088 |
| WO | 2011/089095 | 7/2011 |
| WO | 2011/123043 | 10/2011 |
| WO | 2011/156074 | 12/2011 |

OTHER PUBLICATIONS

Moeck, Martin "Accuracy of Luminance Maps Obtained from High Dynamic Range Images" Journal of Illuminating Engineering Society of North America, published in Oct. 2007.

Ren, P. et al "Pocket Reflectometry" Proceedings of ACM Siggraph 2011.

ColorChecker Digital SG; http://xritephoto.com/ph_product_overview.aspx?ID=938.

* cited by examiner

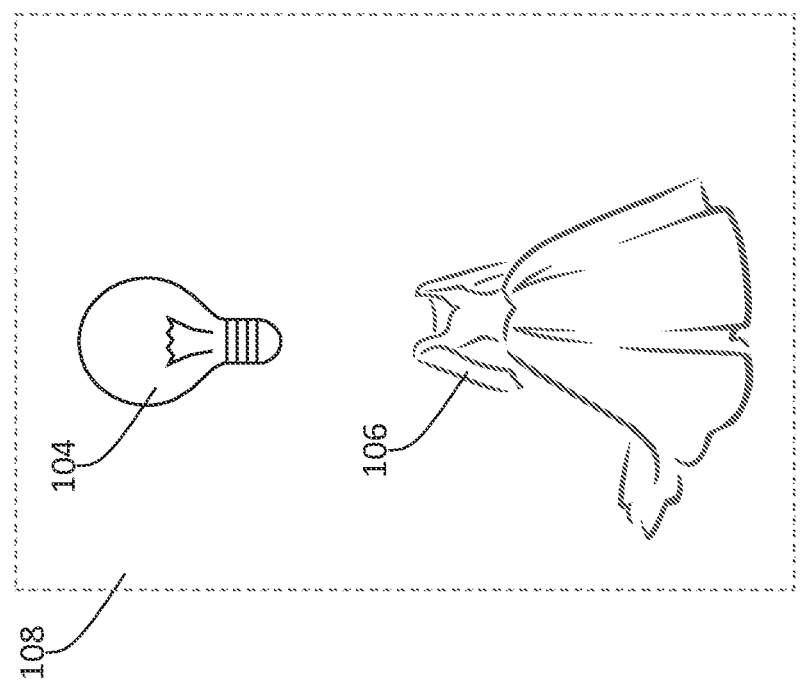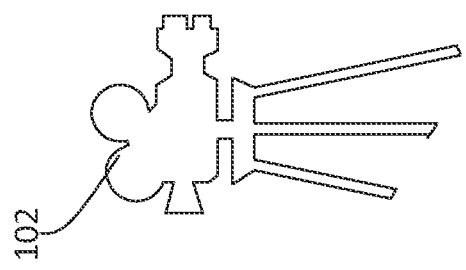
FIG. 1

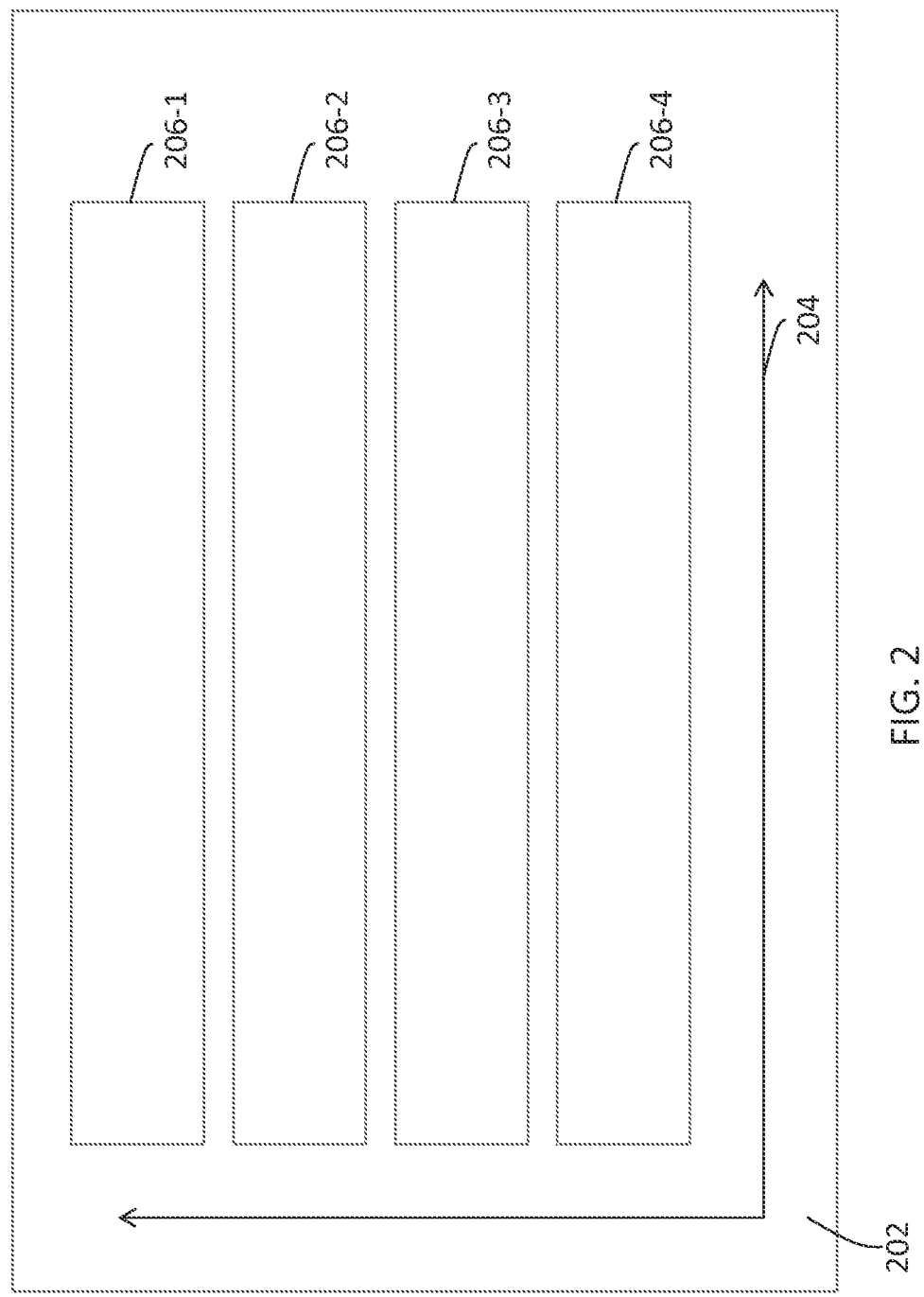

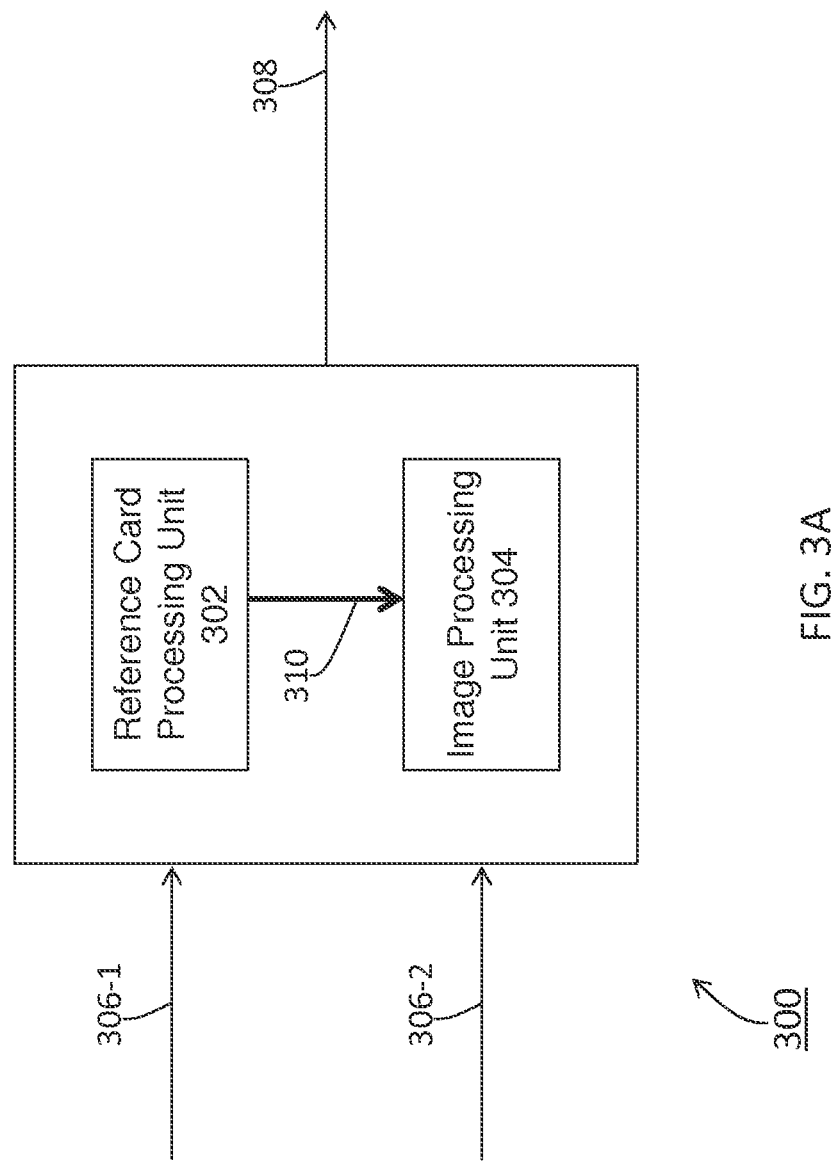

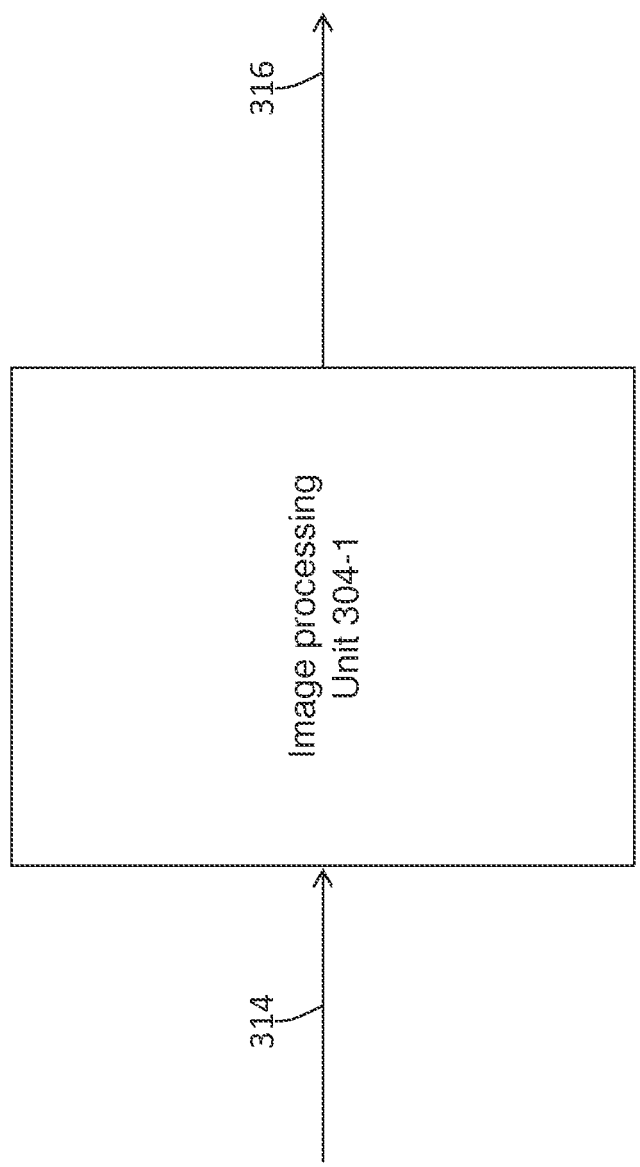

REFERENCE CARD FOR SCENE REFERRED METADATA CAPTURE

CROSS-REFERENCE TO RELATED APPLICATIONS

This application claims priority to U.S. Provisional Patent Application No. 61/640,166, filed 30 Apr. 2012, which is hereby incorporated by reference in its entirety.

TECHNOLOGY

The present invention relates generally to imaging systems, and in particular, to imaging systems that process images with scene-referred metadata.

BACKGROUND

Digital and/or analog manipulations may be performed on source images captured by cameras from scenes to generate processed images for release. The source images contain color values or gray levels recorded on chemical films or digital media with different cameras, different camera settings, and different scenes. Some of the color values or gray levels from different images may correspond to the same figures or objects in reality, but may be different because different cameras and/or different settings may be used in capturing the images from the scenes.

Image processing operations performed on source images may be based on color values or gray levels independent of any particular image, as well as operational parameters with differing value ranges. To determine values for operational parameters, the source images may be sampled; histograms may be constructed from the source images, which may contain relatively limited colors or shades. Thus, guesswork may be made to compensate lack of knowledge for missing colors and shades which could not be determined from image sampling or histogram construction. As a result, image processing operations may be performed with inaccuracy, resulting in undesirable visual effects in generated images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1 illustrates an example scene comprising a plurality of image details;

FIG. 2 illustrates an example reference card, in accordance with an embodiment;

FIG. 3A illustrates an example image processing system, in accordance with an embodiment;

FIG. 3B illustrates an example image processing unit, in accordance with an embodiment;

DESCRIPTION OF EXAMPLE POSSIBLE EMBODIMENTS

Figure 4:
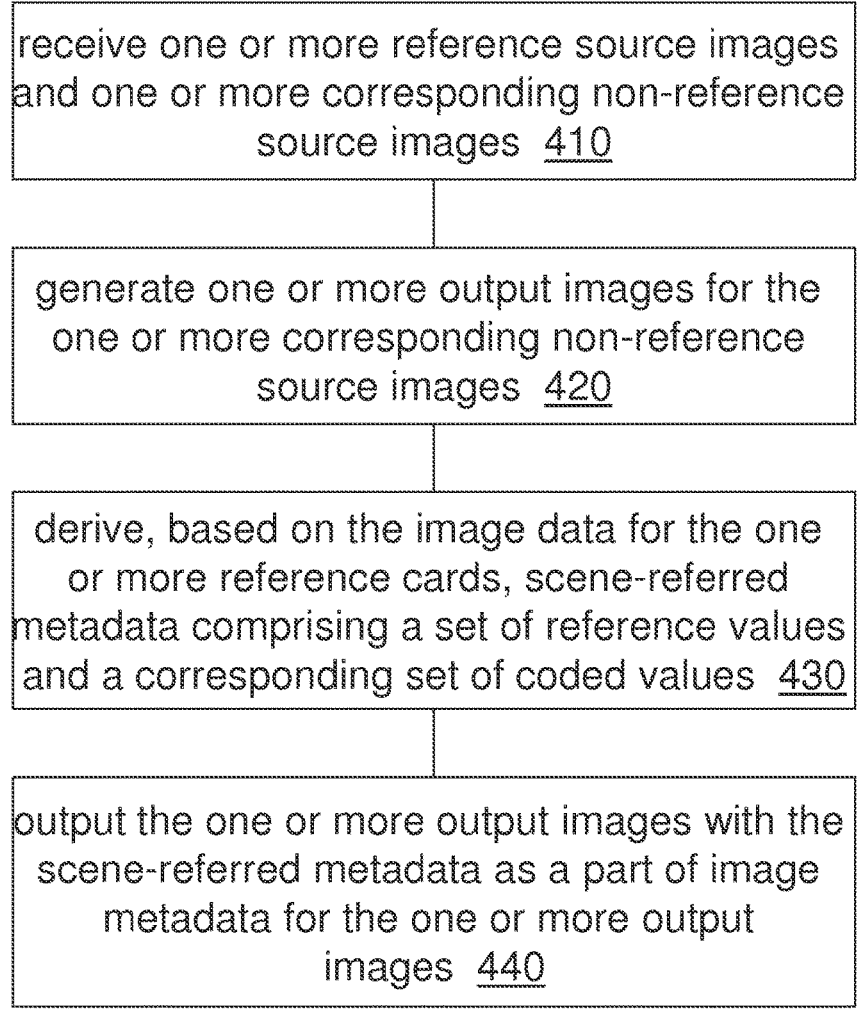
FIG. 4 illustrates an example process flow, in accordance with an embodiment.

Example possible embodiments, which relate to processing images with scene referred metadata, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline (outline section headings are for reference purposes only and shall not in any way control the scope of the present invention):

1. GENERAL OVERVIEW
2. REFERENCE AND NON-REFERENCE SOURCE IMAGES
3. GENERATING AND UPDATING SCENE-REFERRED METADATA
4. EXAMPLE APPLICATIONS OF SCENE-REFERRED METADATA
5. PROCESS FLOW
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Under techniques as described herein, scene-referred metadata may be generated for output images from an image processing operation. Initially, reference cards may be placed in the same scene in which source images for the output images are taken. Images containing the reference cards in the scene may be taken by the same camera that takes the source images. The reference cards may comprise patterned spatial portions representing various reference color values or reference gray levels. Raw pixel values in the images containing the patterned spatial portions representing the reference color values or reference gray levels may be used to derive correspondence relationships between the reference values (reference color values or reference gray levels) and coded values (color values or gray levels) in the source images taken from the same scene. Scene-referred metadata may be generated based on the reference values and the coded values represented in the patterned spatial portions and correspondence relationships between them, and may be included with images of the same scene as part of image metadata of the images. As used herein, the term "scene-referred metadata" refers to separate and different data from images, which the scene-referred metadata accompany. For example, the images may be rendered without using the scene-referred metadata.

When coded values are changed or updated to new coded values in derivative images of the source images in subsequent image processing, the scene-referred metadata may be updated accordingly. Scene-referred metadata, updated along with the derivative images, is provided to downstream image processing devices or image rendering devices as a part of image metadata for the corresponding derivative images.

For the purpose of illustration, images (e.g., containing reference cards) that are used to generate scene-referred metadata may be referred to as reference source images, whereas images that are used to derive output images with the scene-referred metadata as their image metadata may be referred to as non-reference source images. In some embodiments, instead of providing source images with reference cards directly to downstream image processing, only the scene-referred metadata is provided to the downstream image processing.

Non-reference source images may contain fewer coded color values or gray levels than those in corresponding scene-referred metadata. Scene-referred metadata accompanying an input image provides information about a wide range of color values and gray levels from the scene to subsequent image processing, even if some of the color values and gray levels do not exist in the coded values in the input image.

Scene-referred metadata as described herein may be used in a variety of image processing applications. In an example, scene-referred metadata may be used in algorithms to differentiate illuminating objects from reflective objects and/or to treat these objects differently depending on whether they are illuminating or reflective. In another example, scene-referred metadata may be used to harmonize diverse images—e.g., taken by different cameras, different shutter speeds, different apertures, different times of day, different settings, etc.—into a unified movie or a sequence of images with a consistent thematic look.

In some embodiments, mechanisms as described herein form a part of a image processing system, including but not limited to a server, studio system, art director system, image editor, animation system, movie studio system, cameras, TVs, broadcast system, media recording device, media playing device, television, laptop computer, netbook computer, cellular radiotelephone, electronic book reader, point of sale terminal, desktop computer, computer workstation, computer kiosk, and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Reference and Non-Reference Source Images

FIG. 1 illustrates an example scene 108 comprising a plurality of image details. For the purpose of illustration only, the scene 108 may include, but is not limited to, an illuminating object 104 and a reflective object 106. A camera 102 may be used to take pictures (or images) from the scene 108. The camera 102 may be any image acquisition device configured to take pictures from a scene, and may be digital or analog (e.g., photosensitive chemical film-based). The scene 108 may be indoor, outdoor, underwater, in the space, in controlled environments, in natural surroundings, with a combination of different environmental elements, etc.

FIG. 2 illustrates an example reference card (202). The reference card (202) may be of any of a plurality of sizes and/or any of a plurality of shapes. The reference may comprise positioning markings (204) with distinct geometric features or configurations. An image processing system as described herein may be configured to detect these positioning markings (204), and to determine the orientation or geometric positions of reference gray levels and/or reference color values represented in the reference card (202). The reference gray levels and/or reference color values may be arranged in one or more reference spatial patterns on the reference card (202). For the purpose of illustration only, a plurality of reference spatial patterns (206-1 through 206-4) may be used to contain the reference gray levels and/or reference color values. For example, the reference spatial patterns (206-1) may contain a plurality of reference gray levels; the reference spatial patterns (206-2 through 206-4) may each contain a plurality of values for a different color. These different colors may or may not represent color components of a color space that is used to digitally encode the images captured by a camera (e.g., 102).

An image processing system as described herein may be configured to recognize the reference spatial patterns (206-1 through 206-4) without using positioning marks (204) other than the reference spatial patterns (206-1 through 206-4). Thus, positioning markings such as 204 may or may not be present in the reference card (202).

A reference card (e.g., 202) as described herein may contain fewer or more reference spatial patterns, fewer or more reference gray levels, fewer or more reference color values, etc. In an example, the reference card (202) may comprise only gray levels. In another example, the reference card (202) may comprise only color values. Additionally, optionally, or alternatively, reference values of other colors may or may not be included in the reference card (202).

In some embodiments, one or more reference source images for one or more reference cards may be taken by a camera (e.g., 102) in the same scene from which one or more corresponding (non-reference) source images are taken by the same camera (102). In some embodiments, the reference source images may be taken before, after, or at the same time as the corresponding non-reference source images are taken. In some embodiments, the reference source images and the corresponding non-reference source images may be taken under the same settings including but not limited to lighting conditions. In an example, the reference source images may comprise images taken in a specific camera setting. In another example, the reference source images may comprise images taken in a plurality of camera settings. Each camera setting may, but is not limited to, be specified by one or more of specific maker, shooting angle, shooting distance, shutter speed, aperture, focal length, flash setting, sensor settings, recording medium, film type, ISO setting, etc.

In some embodiments, a reference source image for one or more corresponding non-reference source images may be generated or composed by extrapolation or interpolation using other reference source images taken from similar scenes and/or similar camera settings. For example, if the non-reference source images are taken from a scene with a particular camera setting that matches none of reference source images taken from the same scene, reference source images with camera settings closest to the particular camera setting may be found. The reference source images with the closest camera settings may be interpolated and/or extrapolated to generate a reference source image for the non-reference source images.

3. Generating and Updating Scene-Referred Metadata

FIG. 3A illustrates an example image processing system (300) that implements at least some of techniques as described herein, in accordance with an embodiment. In an embodiment, the image processing system (300) generally represents a single device or multiple devices that are configured to process one or more reference source images (306-1) and one or more corresponding non-reference source images (306-2) that are associated with a common (or similar in some embodiments) scene or setting. In some embodiments, the reference source images (306-1) and the corresponding non-reference source images (306-2) may be taken with similar camera settings from the scene. Each of the reference source images (306-1) and the corresponding non-reference source images (306-2) may comprise pixel values, which may be generated based on raw photographic sensory responses captured/recorded by chemical films or digital media.

For the purpose of illustration only, the image processing system (300) may comprise a reference card processing unit (302) and an image processing unit (304).

In an embodiment, the image processing system (300) may comprise a reference card processing unit 302 configured to process the one or more reference source images (306-1) and to generate scene-referred metadata (310), based at least in part on the one or more reference source images (306-1), for the one or more corresponding non-reference source images (306-2). The reference source images (306-1) may comprise images of one or more reference cards placed in the scene, while the non-reference source image may comprise images that may be processed with scene-referred metadata (310) generated based on the reference source images.

In an example embodiment, a reference color value or gray level may correspond to a standard or proprietary color value or gray level defined independent of any specific device (e.g., a camera). The reference color value or gray level may be represented in a reference card as described herein. An image processing system (e.g., 300) may be configured to recognize the reference color value or gray level on the reference card, for example based on pattern recognition and analysis performed on the reference source images. The image processing system (300) may be further configured to determine a corresponding (e.g., scene-referred) pixel value in the reference source images (306-1) for the reference color value or gray level. The corresponding pixel value may be used to derive a corresponding coded value (e.g., coded color value or gray level) for a reference value (e.g., reference color value or gray level). The determination of a reference value and its corresponding coded value may be repeated for some or all of the reference color values or gray levels, thereby establishing one or more mappings between the reference values (e.g., reference color value or gray level) and their corresponding (scene-referred) coded values.

The scene-referred metadata (310) may include, but is not only limited to any of, one or more sets of reference color values and/or reference gray levels, one or more sets of coded color values and/or coded gray levels, one or more mappings between the reference values (e.g., reference color values and/or reference gray levels) and the coded values (coded color values and/or coded gray levels), etc.

In some embodiments, the scene-referred metadata (310) does not store pixel values of the reference source images (306-1). As used herein, a pixel value refers to one or more color values or gray levels representing a pixel in an image (frame). In some embodiments, the pixel of which the pixel value pertains to may be indexed by column and row indexes of an image frame. In contrast, a coded value as described herein refers to a color value or gray level coded for a corresponding reference color value or gray level, irrespective of where the pixel value from which the coded value is derived is located in a reference source image. Thus, while derived from the pixel value, the coded value does not need to carry information or indexes about the pixel value in the reference source image (frame). In some embodiments, instead of carrying a large volume of pixel values, for example, in a two-dimensional array, a much smaller data volume may be used to store one or more sets of reference color values and/or reference gray levels, one or more sets of coded color values and/or coded gray levels, one or more mappings between the reference values (e.g., reference color values and/or reference gray levels) and the coded values (coded color values and/or coded gray levels), etc.

In some embodiments, the non-reference source images (306-2) may comprise a limited set of color values or gray levels, depending on the content of the non-reference source images (306-2). Reference color values or gray levels may include, but are not limited to, a larger set of coded color values or gray levels than the limited set of color values or gray levels in the non-reference source images (306-2). Thus, under techniques as described herein, the scene-referred metadata (310) may include coded values corresponding to reference color values or gray levels that do not exist in the pixel values of the non-reference source images (306-2).

In an embodiment, the image processing system (300) may comprise an image processing unit 304 configured to process the one or more non-reference source images (306-2) and to generate one or more output images (308) based at least in part on the one or more non-reference source images (306-2). One or more image processing operations may be performed by the image processing system (300) on the non-reference source images (306-2) for the purpose of generating the output images (308). Examples of image processing operations include but are not limited only to any of tone mapping, inverse tone mapping, color grading, color space transformations, quantization, inverse quantization, compression, decompression, data coding, data decoding, entropy coding, image buffering, sample filtering, down-sampling, upsampling, interpolation, multiplexing, demultiplexing, interleaving, upscaling, downscaling, motion-compensating, disparity estimation, disparity compensation, depth estimation, depth compensation, encoding, decoding, etc.

An image processing system (e.g., 300) may be configured to make use of the reference values and their corresponding coded values in the scene-referred metadata in its operations. Additionally, optionally, or alternatively, an image processing operation may alter gray levels of pixels as recorded in an input image to different gray levels of the pixels to be outputted in an output image. Additionally, optionally, or alternatively, image processing operations as described herein may alter color values (in one or more color components of a color space) of pixels as recorded in an input image to different color values (in the same color components of the color space, or even in color components of a different color space) of the pixels to be outputted in an output image.

These alternations may, but are not limited to, be based on one or more of linear or non-linear quantizations/dequantizations, gamma corrections, sigmoid curves, etc., and may or may not be device-specific and/or manufacturer-specific.

In some embodiments, the same alterations made by an image processing operation of color values or gray levels of the non-reference source images (306-1) to different color values or gray levels to be outputted in the output images (308) may be applied to coded values (e.g., coded color values or gray levels) in the scene-referred metadata (310) to generate new scene-referred coded values (e.g., new coded color values or gray levels). The new scene-referred coded values may maintain the same correspondence relationships to the same reference values (e.g., reference color values or gray levels) to which the pre-altered scene-referred coded values correspond. The new scene-referred coded values and their correspondence relationships with the reference values may be included as output scene-referred metadata accompanying the output images (308). Additionally, optionally, or alternatively, some or all of the existing information in the scene-referred metadata (310) such as the pre-altered values for the reference values may be included in the output scene-referred metadata. Additionally, optionally, or alternatively, the output scene-referred metadata may be generated from the scene-referred metadata (310) by replacing the pre-altered code values for the reference color values with new coded values for the reference color values or gray levels, as altered by the image processing operation.

As used herein, an input image or an output image may be an intermediate image in a chain of image processing operations. An input image to a current image processing operation may be an output image of a preceding image processing operation. Similarly, an output image from a current image processing operation may serve as an input image of a succeeding image processing operation.

FIG. 3B illustrates an example image processing unit (304-1) which may be a downstream—relative to the image processing unit 304—image processing unit. The image processing unit (304-1) may be in the same image processing system (300) or in a different image processing system other than the image processing system (300). As illustrated in FIG. 3B, the example image processing unit (304-1) may be configured to receive processed non-reference images (314) that may no longer comprise raw pixel values of the corresponding source images taken at a scene. Processed non-reference images may, but are not limited to, comprise the output images (308) of FIG. 3A. The output images (308) are generated at least in part based on the non-reference source images (306-2), and include the scene-referred metadata generated at least in part based on the reference source images (306-1) as a part of image metadata of the output images (308).

Like the image processing unit (304) of FIG. 3A, a downstream image processing unit such as 304-1 of FIG. 3B may be configured to make use of the reference values and their corresponding coded values in the scene-referred metadata in its operations. The image processing unit (304-1) may perform its operations on the processed non-reference images (314) using the scene-referred metadata accompanying the processed non-reference images (314) in the input (e.g., bitstream, image files, sequence of images, etc.).

Additionally, optionally, or alternatively, the image processing operation (304-1) may alter color values or gray levels of pixels as provided in the input processed non-reference images (314) to different color values or gray levels of the pixels to be outputted in new processed non-reference images. These alternations may or may not be different from alternations performed in other image processing operations.

In some embodiments, the same alterations made by the image processing operation (304-1) of color values or gray levels of the processed non-reference images (314) to different color values or gray levels to be outputted in the new processed non-reference images (316) may be applied to coded values (e.g., coded color values or gray levels) in the scene-referred metadata accompanying the processed non-reference images (314) in the input to generate new scene-referred coded values (e.g., new coded color values or gray levels). The new scene-referred coded values may maintain the same correspondence relationships to the same reference values (e.g., reference color values or gray levels) to which the pre-altered scene-referred coded values correspond. The new scene-referred coded values and their correspondence relationships with the reference values may be included as output scene-referred metadata accompanying the new processed non-reference images (316). Additionally, optionally, or alternatively, some or all of the existing information in the scene-referred metadata in the input such as the pre-altered values for the reference values may be included in the output scene-referred metadata. Additionally, optionally, or alternatively, the output scene-referred metadata with the new processed non-reference images may be generated from the scene-referred metadata in the input by replacing the pre-altered code values for the reference color values with new coded values for the reference color values or gray levels, as altered by the image processing operation (304-1).

Thus, one or more image processing operations may be applied to non-reference images to generate final or intermediate non-reference images. Under techniques as described herein, scene-referred metadata may be altered by the same image processing operations, may be used in the image processing operations, and/or may be updated and outputted with output processed non-reference images generated by these image processing operations.

4. Example Applications of Scene-Referred Metadata

Non-reference source images and/or non-reference intermediate images may be digitally manipulated through one or more image processing operations. Digital manipulations of the images may include, but are not limited only to any of, adding special effects to the images, simulating classic looks, adding computer-generated graphics to the images, harmonizing images (e.g., taken by different cameras, with different camera settings, or with different scene settings), increasing dynamic ranges of the images, etc.

As discussed, scene-referred metadata generated under techniques as described herein may be used by an image processing operation, which may be a part of a digital manipulation of images.

In an example, to increase or decrease dynamic range of luminance of non-reference images, one or more specific sigmoid curves may be used to scale gray levels in a previous dynamic range to new gray levels in a new dynamic range. At least one of these curves may be defined with reference gray levels independent of specific devices, specific manufacturers, camera settings, scene settings, etc. Under other techniques, the sigmoid curves are applied to converting gray levels in a to-be-manipulated image as if the gray levels were the same as the reference gray levels which the sigmoid curves assume. However, since the gray levels in the to-be-manipulated image may actually depend on the specific devices, specific manufacturers, camera settings, scene settings, etc., the application of the sigmoid curves under these other techniques results in inaccuracies and may cause resultant images to be surreal-looking.

In sharp contrast, under techniques as described herein, scene-referred metadata may be available with a to-be-processed non-reference image. Thus, an image processing unit as described (e.g., 304 of FIG. 3A, 304-1 of FIG. 3B, etc.) herein may be configured to determine, based on the scene-referred metadata, a reference gray level that corresponds to a coded gray level in the to-be-processed non-reference image. The image processing unit may be configured to adapt the dynamic range alterations based on information determined from the scene-referred metadata. As a result, the sigmoid curves may be correctly applied, resulting in a high quality, accurate output image. In some embodiments, the scene-referred metadata comprises more gray levels than those actually present in the to-be-processed image; thus, operational parameters and the sigmoid curves may be more accurately adapted than other approaches without implementing the techniques as described herein, resulting in even better quality and accuracy in the output image.

In another example, color values in a to-be-processed image may be mapped to new color values to be included in a corresponding output image. For example, a yellowish hue or scan tone may be introduced in the output image by color value conversions to result in a relatively pleasant look to a viewer. The color value conversions may be defined with reference color values independent of specific devices, specific manufacturers, camera settings, scene settings, etc. Under other techniques, the color value conversions are applied to converting color values in a to-be-manipulated image as if the color values were the same as the reference color values which the color value conversions assume. However, since the color values in the to-be-manipulated image may actually depend on the specific devices, specific manufacturers, camera settings, scene settings, etc., the application of the color values under these other techniques results in inaccurate application of color value conversions.

In sharp contrast, under techniques as described herein, scene-referred metadata may be available with a to-be-processed non-reference image. Thus, an image processing unit as described (e.g., 304 of FIG. 3A, 304-1 of FIG. 3B, etc.) herein may be configured to determine, based on the scene-referred metadata, a reference color value that corresponds to a coded color value in the to-be-processed non-reference image. The image processing unit may be configured to adapt the color value conversions based on information determined from the scene-referred metadata. As a result, the color value conversions may be correctly applied, resulting in a high quality, accurate output image. In some embodiments, the scene-referred metadata comprises more color values than those actually present in the to-be-processed image; thus, operational parameters and the color value conversions may be more accurately adapted than other approaches that do not implement the techniques as described herein, resulting in even better quality and accuracy in the output image.

In some embodiments, scene-referred metadata is used by an image processing system to determine whether a corresponding image comprises a large amount of saturated colors, as the scene-referred metadata comprises reference values that may be searched based on coded values. Thus, an image processing operation that alters the saturation levels of colors may use this information determined from the scene-referred metadata to perform the alternations more accurately than otherwise.

Scene-referred metadata as described herein may be used to process information intrinsic to corresponding images that carry the scene-referred metadata, as discussed above, as well as to add/introduce new visual elements into the images. For example, a computer-generated (CG) visual element such as a cartoon figure may need to be added to existing images that constitute a part of movie or a sequence of images. The cartoon figure may be described by color values or gray levels in different spatial positions. The color values or gray levels describing the cartoon figure may be specified with reference color values or gray levels. Under other techniques, the cartoon figure is inserted into a to-be-manipulated image as if existing color values or gray levels in the to-be-manipulated image were the same as the reference color values or gray levels that describe the cartoon figure. However, since the color values in the to-be-manipulated image may actually depend on the specific devices, specific manufacturers, camera settings, scene settings, etc., and since the cartoon figure is described by reference color values or gray levels, the addition or introduction of the cartoon figure into existing images under these other techniques results in the cartoon figure looking out of place with the rest of the image details in the images.

In sharp contrast, under techniques as described herein, scene-referred metadata may be available with a to-be-processed non-reference image. Thus, an image processing unit as described (e.g., 304 of FIG. 3A, 304-1 of FIG. 3B, etc.) herein may be configured to determine, based on the scene-referred metadata, a reference value (e.g., reference color value, gray level, etc.) that corresponds to a coded value (e.g., coded color value or coded gray level) in the to-be-processed non-reference image. The image processing unit may be configured to determine corresponding coded color values or gray levels for the reference color values or gray levels that describe the cartoon figure based on information determined from the scene-referred metadata. As a result, the cartoon figure may be correctly added or introduced into existing images, resulting in a high quality, natural fusion of the cartoon figure (e.g., with live actions) in the existing images.

Scene-referred metadata as described herein may be used to process images taken by different cameras or different camera settings or different scene settings into images that harmonize with one another. Different cameras may be used in outdoor scenes and indoor scenes. Even in the same scene setting, such as a film studio, different cameras and/or different camera settings may be used to capture action scenes and relatively static scenes. Thus, due to the differences of the cameras, camera settings, scenes, etc., the images to be processed by an image processing system may appear quite different. Under other techniques, a harmonizing image processing operation may be applied to a wide variety of images in a relatively ad hoc manner. For example, different pixel values from two different images may correspond to the same reference color values or gray levels. However, the harmonizing image processing operation under other techniques is not provided with scene-referred metadata to determine this fact and act accordingly. Thus, images harmonized under these other techniques may still look quite different to a viewer because the harmonizing image processing operation applies to pixel values that may be specific to particular cameras or camera settings or scene settings.

In sharp contrast, under techniques as described herein, scene-referred metadata may be available with a wide variety of images that are to be assembled into a movie or a sequence of images. An image processing unit as described (e.g., 304 of FIG. 3A, 304-1 of FIG. 3B, etc.) herein may be configured to determine, based on scene-referred metadata for a to-be-processed image, a reference value (e.g., reference color value, gray level, etc.) that corresponds to a coded value (e.g., coded color value or coded gray level) in the to-be-processed non-reference image. Thus, coded values of different images to be harmonized may be mapped correctly to reference values based on the respective scene-referred metadata. The image processing unit may be configured to harmonize the images based on the information determined from the scene-referred metadata, resulting in a high quality, consistent, harmonized look in the output images.

Scene-referred metadata as described herein may be used to process different portions of an image differently. For example, the image may contain an illuminating object (e.g., 104 of FIG. 1) and a reflective object (e.g., 106 of FIG. 1). One or more algorithms may be applied to recognize illuminating objects and/or reflective objects in the image. In some embodiments, such an algorithm is configured to divide an image frame into multiple segments and determine color temperatures for these segments, respectively. The differentiation of illuminating objects from reflective objects may be based at least in part on the respective temperatures of the segments. This determination may or may not be purely based on gray level information of the images. Also, an image under analysis may or may not be divided into equal sizes. Additionally, optionally, or alternatively, illuminating objects in the image may be treated differently from reflective objects in the image by an image processing operation. For example, shadows in reflective objects may be darkened based on the positions of illuminating objects. Under other techniques, the algorithms entirely rely on coded values in the image, which are not of correct color temperatures, and possibly result in incorrect recognition or a mix-up of illuminating objects and/or reflective objects in the image. Treatment of illuminating objects and/or reflective objects may not be accurate, influenced by coded values that are dependent on the camera, camera settings, scene settings, etc. For example, a reflective dress may be incorrectly recognized as an illuminating object and may be scaled to a luminance level that corresponds to a light bulb.

In sharp contrast, under techniques as described herein, reference values for coded values in an image may be determined based on scene-referred metadata for the image. An image processing unit as described (e.g., 304 of FIG. 3A, 304-1 of FIG. 3B, etc.) herein may be configured to apply algorithms based on the reference values, which provide the correct color temperature information for different portions of the image. Thus, illuminating objects and/or reflective images in the image may be relatively accurately determined. As a result, the image processing unit may be configured to treat different portions of the same image differently based on whether they portray illuminating objects or reflective objects, resulting in high quality, correct correlations between illuminating objects and reflective objects in the output image.

Scene-referred metadata as described herein may include metadata other than previously discussed. In some embodiments, scene-referred metadata may include, but is not limited only to, any of camera types, camera settings, scene settings, etc. For example, the scene-referred metadata may include location and shooting angles of a camera relative to the scene from which a reference source image is taken.

In some embodiments, an image processing system as described herein may be configured to interpolate or extrapolate existing reference source images or existing scene-referred metadata to obtain a constructive reference source image or constructive scene-referred metadata for one or more non-reference source images or non-reference intermediate images. For example, a reference source image may be taken with a particular shooting angle of 30 degrees at a scene, while another reference source image may be taken with a shooting angle of 45 degrees at the scene. For non-reference source images taken with a shooting angle of 40 degrees, the two reference source images may be determined by an image processing system as the closest. Constructive scene-referred metadata for the non-reference source images may be obtained by interpolating or extrapolating the closest reference source images, or scene-referred metadata generated therefrom. In some embodiments, different weight factor values may be assigned to different reference source images or scene-referred data. For example, the reference source image of 45 degrees or the scene-referred metadata generated therefrom may be given a larger weight factor value than that assigned to the reference source image or the scene-referred metadata of 30 degrees.

Similarly, for an outdoor scene, reference source images or scene-referred metadata may be available for two particular times that are determined to be the closest to the shooting time of non-reference source images. The reference source images or the scene-referred metadata from the two particular times may be interpolated or extrapolated by an image processing system to generate constructive scene-referred metadata for the non-reference source images.

5. Process Flow

FIG. 4 illustrates an example process flow according to an example embodiment of the present invention. In some example embodiments, one or more computing devices or components may perform this process flow. In block 410, an image processing system (e.g., 300 as illustrated in FIG. 3A) receives one or more reference source images and one or more corresponding non-reference source images. The one or more reference source images may comprise image data for one or more reference cards.

In block 420, the image processing system (300) generates one or more output images for the one or more corresponding non-reference source images.

In block 430, the image processing system (300) derives, based on the image data for the one or more reference cards, scene-referred metadata comprising a set of reference values and a corresponding set of coded values. Here, the corresponding set of coded values comprises coded values in the one or more output images.

In block 440, the image processing system (300) outputs the one or more output images with the scene-referred metadata as a part of image metadata for the one or more output images.

In an embodiment, the set of reference values comprises at least one of reference color values or reference gray levels, while the set of coded values comprises at least one of coded color values or coded gray levels.

In an embodiment, the scene-referred metadata is derived from a previous version of scene-referred metadata; and the previous version of scene-referred metadata comprises the set of reference values and a corresponding set of previously coded values.

In an embodiment, the one or more output images are derived from one or more previous output images; the scene-referred metadata is derived from a previous version of scene-referred metadata; the previous version of scene-referred metadata comprises the set of reference values and a corresponding set of previously coded values; and the corresponding set of previously coded values comprises coded values in the one or more previous output images derived from the one or more non-reference source images.

In an embodiment, the output images are generated from one or more previous images by one or more image processing operations; and the one or more image processing operations comprise at least one of (a) image processing operations that do not use a new set of coded values that are different from a previous version of coded values used to code the one or more previous images, or (b) image processing operations that use a new set of coded values that are different from a previous version of coded values used to code the one or more previous images.

In an embodiment, the one or more image processing operations are configured to superimpose, in compliance with one or more correspondence relationships between the set of reference values and the set of coded values in the scene-referred metadata, a computer-generated image portion with existing image content of the one or more output images; and the existing image content is derived from image content of the one or more non-reference source images.

In an embodiment, the one or more image processing operations are configured to code, in compliance with one or more correspondence relationships between the set of reference values and the set of coded values in the scene-referred metadata, gray levels of the one or more output images; and the existing image content is derived from image content of the one or more non-reference source images.

In an embodiment, the one or more image processing operations are configured to code, in compliance with one or more correspondence relationships between the set of reference values and the set of coded values in the scene-referred metadata, color values of the one or more output images; and the existing image content is derived from image content of the one or more non-reference source images.

In an embodiment, the one or more image processing operations are configured to differentiate light sources or illuminating objects from reflective objects in the one or more non-reference source images based at least in part on the scene-referred metadata.

In an embodiment, the one or more image processing operations are configured to harmonize the one or more output images with one or more other output images using other scene-referred metadata for the one or more other output images and the scene-referred metadata for the one or more output images.

In an embodiment, the one or more image processing operations comprise at least one of tone mapping, inverse tone mapping, color grading, color space transformations, quantization, inverse quantization, compression, decompression, data coding, data decoding, entropy coding, image buffering, sample filtering, down-sampling, upsampling, interpolation, multiplexing, demultiplexing, interleaving, upscaling, downscaling, motion-compensating, disparity estimation, disparity compensation, depth estimation, depth compensation, encoding, or decoding.

In an embodiment, the one or more reference source images and the one or more non-reference source images relate to one or more of a same camera, a same camera setting, or a same scene setting.

In an embodiment, the scene-referred metadata further comprises one or more of information about one or more cameras that take the one or more reference source images and the one or more non-reference source images, information about one or more camera settings with which the one or more reference source images and the one or more non-reference source images are taken, or information about one or more scene settings with which the one or more reference source images and the one or more non-reference source images are taken.

In an embodiment, the image processing system (300) is further configured to perform: receiving one or more other reference source images and one or more other corresponding non-reference source images, one or more other reference source images comprising image data for one or more reference cards; generating one or more other output images for the one or more other corresponding non-reference source images; deriving, based on the image data for the one or more reference cards, other scene-referred metadata comprising a set of reference values and a corresponding set of coded values, the corresponding set of coded values comprises coded values in the one or more other output images; and outputting the one or more other output images with the other scene-referred metadata as a part of image metadata for the one or more other output images.

In an embodiment, the image processing system (300) is further configured to perform: receiving one or more other non-reference source images; generating one or more other output images for the one or more other non-reference source images; deriving, based at least in part on the scene-referred metadata, other scene-referred metadata comprising a set of reference values and another set of coded values, the other set of coded values comprises coded values representing coded values in the one or more other output images; and outputting the one or more other output images with the other scene-referred metadata as a part of image metadata for the one or more other output images.

In an embodiment, the image processing system (300) is further configured to automatically recognize one or more spatial patterns on the reference cards without receiving user input relating to locations of the reference cards inside any of the one or more reference source images, and wherein at least one of the one or more spatial patterns comprises at least one of reference color values or reference gray levels.

In an embodiment, the image processing system (300) is further configured to convert one or more input images represented, received, transmitted, or stored with one or more input video signals into one or more output images represented, received, transmitted, or stored with one or more output video signals.

In an embodiment, at least one of the output images comprises image data encoded in one of: a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space, or a YCbCr color space.

Embodiments include an apparatus comprising a processor and configured to perform any one of the foregoing methods as discussed above.

Embodiments include a computer readable storage medium, comprising software instructions, which when executed by one or more processors cause performance of any one of the foregoing methods as discussed above.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
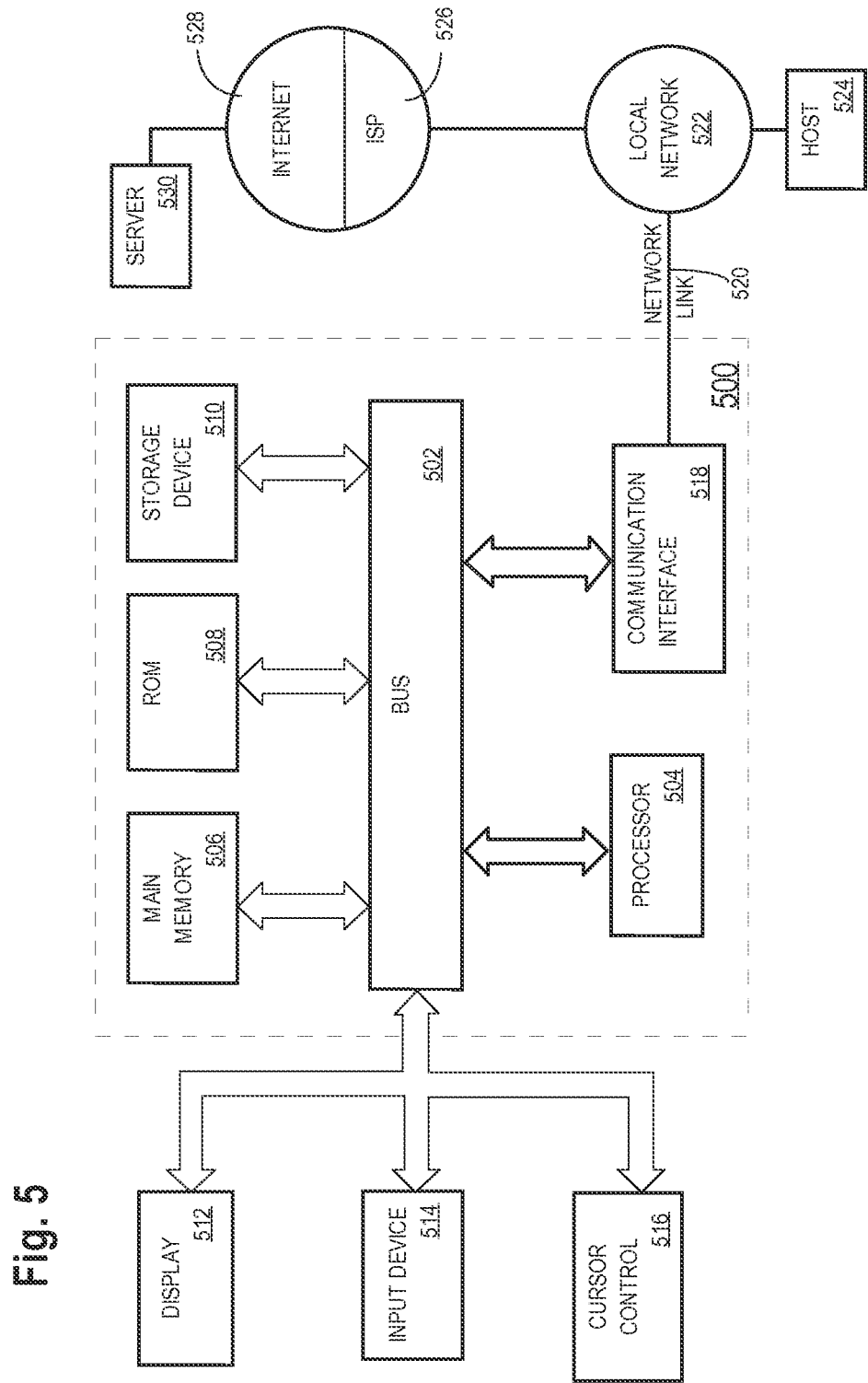
FIG. 5 illustrates an example hardware platform on which a computer or a computing device as described herein may be implemented, in accordance with an embodiment.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

7. Equivalents, Extensions, Alternatives and Miscellaneous

To illustrate a clear example, images taken from a reality are used to illustrate some aspects of the present invention. It should be noted that other types of images may also be used in embodiments of the present invention. For example, images may be composite frames from two or more different image sources. Furthermore, a part, or a whole, of an image may be sourced from a 2D image, while another part on the same image may be sourced from a 3D or multi-view image. Techniques as described herein may be provided for these other types of images in embodiments of the present invention.

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving one or more reference source images and one or more corresponding non-reference source images, the one or more reference source images comprising image data for one or more reference cards comprising a plurality of reference gray levels and primary colors used to digitally encode the reference source images;
   generating one or more output images for the one or more corresponding non-reference source images;
   deriving, based on the image data for the primary colors and gray levels of the one or more reference cards, scene-referred metadata comprising a set of reference values and a corresponding set of coded values, the corresponding set of coded values comprising coded values in the one or more output images;
   generating a constructive set of scene-referred metadata by interpolating data from one of two or more existing reference source images and two or more existing scene-referred metadata; and
   outputting the one or more output images with the scene-referred metadata as a part of image metadata for the one or more output images.

2. The method of claim 1, wherein the set of reference values comprises at least one of reference color values or reference gray levels, and wherein the set of coded values comprises at least one of coded color values or coded gray levels.

3. The method of claim 1, wherein the scene-referred metadata is derived from a previous version of scene-referred metadata, and wherein the previous version of scene-referred metadata comprises the set of reference values and a corresponding set of previously coded values.

4. The method of claim 1, wherein, the one or more output images are derived from one or more previous output images; wherein the scene-referred metadata is derived from a previous version of scene-referred metadata; wherein the previous version of scene-referred metadata comprises the set of reference values and a corresponding set of previously coded values; and the corresponding set of previously coded values comprises coded values in the one or more previous output images derived from the one or more non-reference source images.

5. The method of claim 1, wherein the output images are generated from one or more previous output images by one or more image processing operations, and wherein the one or more image processing operations comprise at least one of (a) image processing operations that do not use a new set of coded values that are different from a previous version of coded values used to code the one or more previous output images, or (b) image processing operations that use a new set of coded values that are different from a previous version of coded values used to code the one or more previous output images.

6. The method of claim 5, wherein the one or more image processing operations are configured to superimpose, in compliance with one or more correspondence relationships between the set of reference values and the set of coded values in the scene-referred metadata, a computer-generated image portion over existing image content of the one or more output images, and wherein the existing image content is derived from image content of the one or more non-reference source image.

7. The method of claim 5, wherein the one or more image processing operations are configured to code, in compliance with one or more correspondence relationships between the set of reference values and the set of coded values in the scene-referred metadata, gray levels of the one or more output images, and wherein the existing image content is derived from image content of the one or more non-reference source images.

8. The method of claim 5, wherein the one or more image processing operations are configured to code, in compliance with one or more correspondence relationships between the set of reference values and the set of coded values in the scene-referred metadata, color values of the one or more output images, and wherein the existing image content is derived from image content of the one or more non-reference source images.

9. The method of claim 5, wherein the one or more image processing operations are configured to differentiate light sources from reflective objects in the one or more non-reference source images based at least in part on the scene-referred metadata.

10. The method of claim 5, wherein the one or more image processing operations are configured to harmonize the one or more output images with one or more other output images using other scene-referred metadata for the one or more other output images and the scene-referred metadata for the one or more output images.

11. The method of claim 5, wherein the one or more image processing operations comprise at least one of tone mapping, inverse tone mapping, color grading, color space transformations, quantization, inverse quantization, compression, decompression, data coding, data decoding, entropy coding, image buffering, sample filtering, downsampling, upsampling, interpolation, multiplexing, demultiplexing, interleaving, upscaling, downscaling, motion-compensating, disparity estimation, disparity compensation, depth estimation, depth compensation, encoding, or decoding.

12. The method of claim 1, wherein the one or more reference source images and the one or more non-reference source images relate to one or more of a same camera, a same camera setting, or a same scene setting.

13. The method of claim 1, wherein the scene-referred metadata further comprises one or more of information about one or more cameras that capture the one or more reference source images and the one or more non-reference source images, information about one or more camera settings with which the one or more reference source images and the one or more non-reference source images are captured, or information about one or more scene settings with which the one or more reference source images and the one or more non-reference source images are captured.

14. The method of claim 1, further comprising:
receiving one or more other reference source images and one or more other corresponding non-reference source images, the one or more other reference source images comprising image data for one or more reference cards;
generating one or more other output images for the one or more other corresponding non-reference source images;
deriving, based on the image data for the one or more reference cards, other scene-referred metadata comprising a set of reference values and a corresponding set of coded values, the corresponding set of coded values comprising coded values in the one or more other output images; and
outputting the one or more other output images with the other scene-referred metadata as a part of image metadata for the one or more other output images.

15. The method of claim 1, further comprising:
receiving one or more other non-reference source images;
generating one or more other output images for the one or more other non-reference source images;
deriving, based at least in part on the scene-referred metadata, other scene-referred metadata comprising a set of reference values and another set of coded values, the other set of coded values comprises coded values representing coded values in the one or more other output images; and
outputting the one or more other output images with the other scene-referred metadata as a part of image metadata for the one or more other output images.

16. The method of claim 1, further comprising automatically recognizing one or more spatial patterns on the reference cards without receiving user input relating to locations of the reference cards inside any of the one or more reference source images, and wherein at least one of the one or more spatial patterns comprises at least one of reference color values or reference gray levels.

17. The method as recited in claim 1, further comprising converting one or more input images represented, received, transmitted, or stored with one or more input video signals into one or more output images represented, received, transmitted, or stored with one or more output video signals.

18. The method as recited in claim 1, wherein at least one of the output images comprises image data encoded in at least one of: a high dynamic range (HDR) image format, a RGB color space associated with the Academy Color Encoding Specification (ACES) standard of the Academy of Motion Picture Arts and Sciences (AMPAS), a P3 color space standard of the Digital Cinema Initiative, a Reference Input Medium Metric/Reference Output Medium Metric (RIMM/ROMM) standard, an sRGB color space, a RGB color space, or a YCbCr color space.

19. The method according to claim 1, wherein the non-reference source images contain fewer coded values than those contained in corresponding scene-referred metadata.

20. An apparatus comprising a processor and configured to perform the method as recited in claim 1.

* * * * *